United States Patent
Mori et al.

(10) Patent No.: US 9,505,329 B2
(45) Date of Patent: Nov. 29, 2016

(54) VEHICLE SEAT AND SEAT BACK BOARD

(75) Inventors: Hisaya Mori, Aichi-gun (JP); Shinji Awata, Aichi-gun (JP); Hideki Kobayashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 14/114,127

(22) PCT Filed: May 2, 2011

(86) PCT No.: PCT/JP2011/060554
§ 371 (c)(1),
(2), (4) Date: Oct. 25, 2013

(87) PCT Pub. No.: WO2012/150633
PCT Pub. Date: Nov. 8, 2012

(65) Prior Publication Data
US 2014/0049090 A1    Feb. 20, 2014

(51) Int. Cl.
  *B60N 2/70*   (2006.01)
  *B60N 2/58*   (2006.01)
  *B60N 2/72*   (2006.01)

(52) U.S. Cl.
  CPC ........... *B60N 2/7094* (2013.01); *B60N 2/5825* (2013.01); *B60N 2/72* (2013.01)

(58) Field of Classification Search
  USPC ................................. 297/218.2, 218.3, 452.6
  See application file for complete search history.

(56) References Cited

U.S. PATENT DOCUMENTS

| | | | | |
|---|---|---|---|---|
| 3,727,980 A | * | 4/1973 | Tischler | 297/452.53 |
| 3,794,378 A | * | 2/1974 | Haslam et al. | 297/452.6 |
| 5,054,845 A | * | 10/1991 | Vogel | 297/216.14 |
| 6,122,806 A | * | 9/2000 | Umezawa | B60N 2/5825 24/546 |
| 6,241,188 B1 | * | 6/2001 | Simpson et al. | 244/122 R |
| 7,100,990 B2 | * | 9/2006 | Kimura et al. | 297/452.55 |
| 7,487,575 B2 | * | 2/2009 | Smith | 24/297 |
| 8,099,837 B2 | * | 1/2012 | Santin et al. | 24/297 |
| 8,191,971 B2 | * | 6/2012 | Lovasz | 297/452.6 |
| 8,197,010 B2 | * | 6/2012 | Galbreath et al. | 297/452.6 |
| 8,690,257 B2 | * | 4/2014 | Stiller et al. | 297/452.6 |
| 9,033,421 B2 | * | 5/2015 | Wilkinson et al. | 297/452.64 |
| 2004/0183356 A1 | | 9/2004 | Philippot et al. | |
| 2008/0185884 A1 | | 8/2008 | Hansen | |
| 2008/0258523 A1 | * | 10/2008 | Santin et al. | 297/218.2 |
| 2009/0146470 A1 | * | 6/2009 | Thompson et al. | 297/180.12 |

(Continued)

FOREIGN PATENT DOCUMENTS

| EP | 0 328 137 A2 | 8/1989 | |
|---|---|---|---|
| EP | 359643 A1 * | 3/1990 | A47C 31/02 |

(Continued)

*Primary Examiner* — David E Allred
(74) *Attorney, Agent, or Firm* — Oliff PLC

(57) ABSTRACT

A vehicle seat and a seat back board are obtained in which a seat cover can easily be anchored to a resin spring. In a seat back board, clips attached on a cover side are engaged with vertical clip engagement portions of the seat back board, thereby enabling the cover to be anchored to a back spring section of the seat back board. An anchoring operation of the cover to the back spring section can accordingly be made easier than in conventional anchoring structures employing for example hog rings. Moreover, since only pairs of openings are formed to the back spring section of the seat back board in order to provide the vertical clip engagement portions, any detriment to the moldability of the back spring section can be avoided.

10 Claims, 9 Drawing Sheets

(56) References Cited

U.S. PATENT DOCUMENTS

| | | | |
|---|---|---|---|
| 2009/0295215 A1* | 12/2009 | Galbreath et al. | 297/452.6 |
| 2013/0134749 A1* | 5/2013 | Awata | B60N 2/5825 297/216.13 |
| 2014/0070594 A1* | 3/2014 | Awata | B60N 2/5825 297/452.48 |
| 2014/0183846 A1* | 7/2014 | Fujiwara | B60R 21/207 280/729 |
| 2014/0225352 A1* | 8/2014 | Awata | B60R 21/207 280/728.2 |
| 2015/0159721 A1* | 6/2015 | Okubo | B60N 2/48 297/404 |

FOREIGN PATENT DOCUMENTS

| | | |
|---|---|---|
| FR | 2 947 775 A1 | 1/2011 |
| JP | A-61-150845 | 7/1986 |
| JP | U-63-54356 | 4/1988 |
| JP | Y2-2-47899 | 12/1990 |
| JP | U-6-44458 | 6/1994 |
| JP | U-6-70645 | 10/1994 |
| JP | A-6-304353 | 11/1994 |
| JP | Y2-2526956 | 2/1997 |
| JP | A-10-71916 | 3/1998 |
| JP | 2004-008488 A | 1/2004 |
| JP | A-2004-138156 | 5/2004 |
| JP | A-2010-57855 | 3/2010 |

* cited by examiner

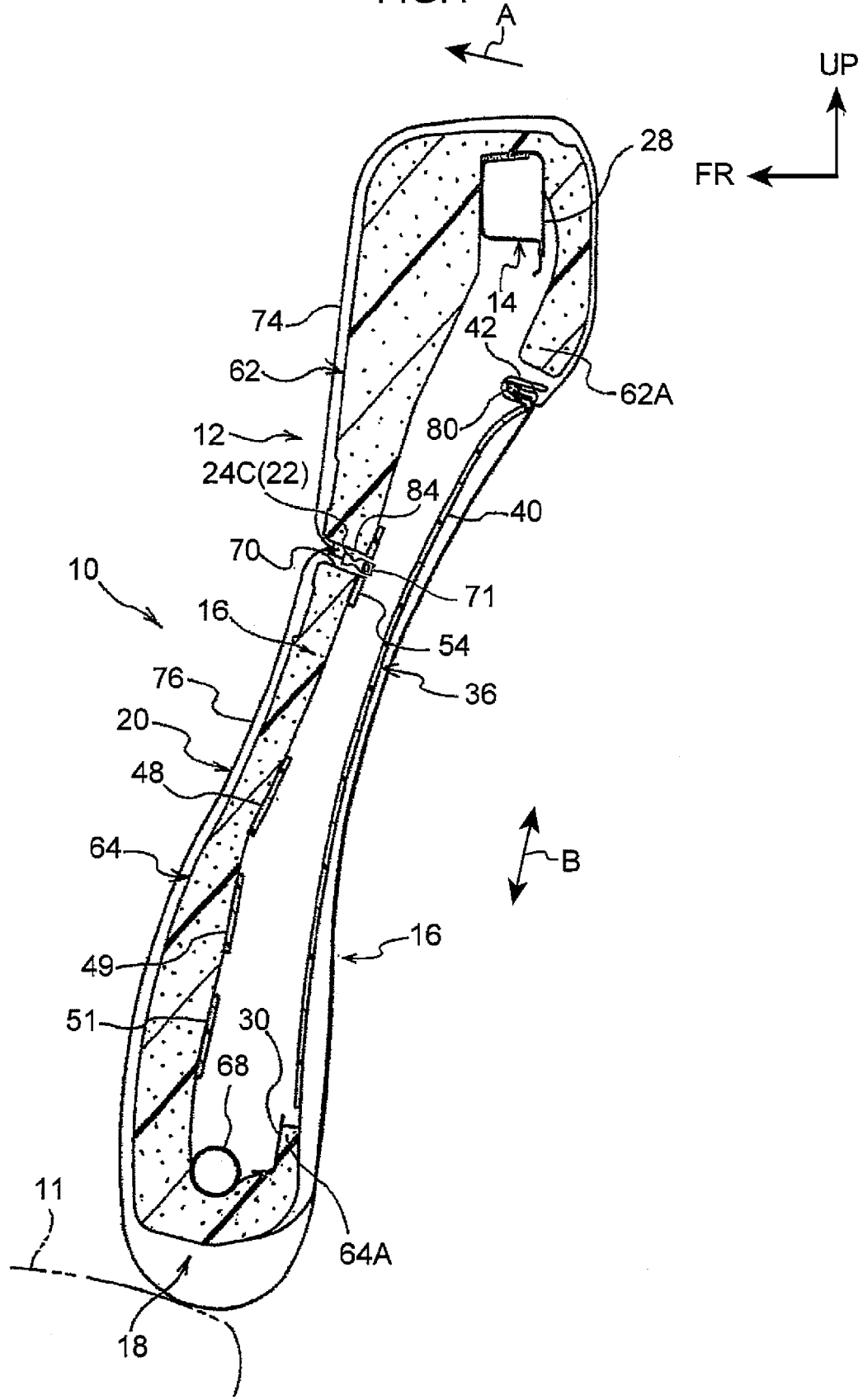

VEHICLE SEAT AND SEAT BACK BOARD

TECHNICAL FIELD

The present invention relates to vehicle seat and a seat back board provided with a resin spring.

BACKGROUND ART

There is demand for weight reduction in vehicle seats. Patent Document 1 below describes a spring that spans between a pair of left and right side frames provided to a seatback frame. The spring is made from resin from the perspective of reducing the weight of the vehicle seat.

Patent Document 1: Japanese Patent Application Laid-Open (JP-A) No. 2004-138156

DISCLOSURE OF INVENTION

Technical Problem

When metal springs are provided to a vehicle seat, generally a pad of a cushioning material is supported on the metal springs and a seat cover that covers a front face of the pad is anchored to the metal rings through for example hog rings. Employing a structure for anchoring a seat cover to a resin spring such as described above may also be considered, however conventional anchoring structures using for example hog rings involve a complicated anchoring operation.

In consideration of the above circumstances, an object of the present invention is to obtain a vehicle seat and a seat back board wherein a seat cover can easily be anchored to a resin spring.

Solution to Problem

A vehicle seat according to an embodiment includes: a resin spring that is made from resin, that is supported at both end sides by a seat frame, and that is formed with an opening; a pad supported on the resin spring; a seat cover that covers a front face of the pad; and an anchor means that is attached to the seat cover side and anchored to an edge portion of the opening.

The pad may be supported by the resin spring that is supported by the seat frame. The anchor means may be attached to the seat cover that covers the pad, and the anchor means may be engaged with the edge portion of the opening formed in the resin spring. The seat cover can accordingly be easily anchored to the resin spring through the anchor means. Moreover, since only the opening is formed to the resin spring in order to anchor the seat cover, any detriment to the moldability of the resin spring can be avoided.

The resin spring may be formed with a pair of openings that are adjacent to each other; the anchor means may be configured by a clip that includes a pair of arm portions that are respectively inserted into the pair of openings, with a hook portion formed at a leading end side of each arm portion; and a clip engagement portion, that each of the respective hook portions hook onto, may be configured between the pair of openings.

The pair of arm portions provided to the clip may be respectively inserted into the pair of openings formed in the resin spring, the hook portions formed at the leading end sides of the pair of arm portion's hook onto the clip engagement portion formed between the pair of openings. The seat cover to which the clip is attached can accordingly be easily anchored to the resin spring. Moreover, by moving the pair of arm portions apart from each other, the clip, namely the seat cover, can be removed from the resin spring. A removal operation of the anchor means from the resin spring can accordingly be made easier than in a configuration wherein for example an arrowhead shaped anchor means is inserted into a single opening and anchored to edge portions of the opening.

The clip may be configured such that when base end sides of the pair of arm portions are brought towards each other, the leading end sides of the pair of arm portions pivot about an intermediate portion of the pair of arm portions so as to move apart from each other.

During removal of the clip from the resin spring, it may be sufficient to bring the base end sides of the pair of arm portions towards each other. Since the leading end sides of the pair of arm portions pivot about the intermediate portion of the pair of arm portions so as to move apart from each other, the hooking of the hook portions to the clip engagement portion of the resin spring can be released. A removal operation of the clip (namely the seat cover) from the resin spring can accordingly be made even easier.

The resin spring may be provided with a flexing portion formed with a wave shaped cross-section profile; and the opening is formed in the flexing portion.

A contribution can easily be made to the spring characteristics of the resin spring with a simple configuration due to providing the resin spring with the flexing portion formed with a wave shaped cross-section profile. Moreover, the spring constant of the resin spring can be easily varied by appropriately varying the setting for the position of the opening formed to the resin spring.

The resin spring may be fixed at both end portions to the seat frame; and the opening may be formed at a location excluding both end portions and a central portion of the resin spring.

Both end portions of the resin spring may be fixed to the seat frame. Accordingly, similarly to with a support beam that is fixed at both ends, stress is greatest at both end portions and a central portion of the resin spring when load is input to a central portion side of the resin spring. In the present invention, the opening for engaging the clip to the resin spring is formed at a location excluding both end portions and the central portion of the resin spring. Namely, since the opening is formed so as to avoid the locations at which stress is greatest, the resin spring can be set with a small width whilst still securing the strength and rigidity of the resin spring. It is accordingly possible to achieve a reduction in weight and a reduction in cost for the resin spring, and thereby for the vehicle seat.

At least two of the anchor means attached to the seat cover side may be respectively anchored to edge portions of at least two of the openings formed to the resin spring, such that the at least two of the anchor means have different engagement directions, with respect to the edge portions, to each other, the seat cover thereby positioning the pad with respect to the resin spring in at least two directions.

At least two of the anchor means attached to the seat cover side may be respectively anchored to edge portions of at least two of the openings formed to the resin spring. Unintentional positional displacement of the pad with respect to the resin spring can accordingly be suppressed since the seat cover positions the pad in at least two directions with respect to the resin spring. Moreover, the engagement directions of the at least two of the anchor means with respect to the edge portions of the at least two of the openings may be set so as to be different to each other. Accordingly, for example by setting the dimensions of each of the openings larger than the dimensions of each of the anchor means, the pad can be positioned with respect to the resin spring in at least two directions by the at least two of the anchor means, even when each of the anchor means is capable of relative movement in a direction orthogonal to the engagement direction with respect to the resin spring. Namely, manufacture of the vehicle seat can be made easier since the pad can be positioned with respect to the resin spring in at least two directions whilst any variation in assembly of the pad with respect to the resin spring is absorbed by relative movement of the anchor means.

The seat frame may be a seatback frame including a pair of left and right side frames; the resin spring may be disposed along a seatback width direction between the pair of side frames; the pad may be a seatback pad that is disposed on a front face side of the resin spring and that is provided with a communication portion that places a front face side and a rear face side of the pad in communication with each other; the seat cover may cover at least the front face side of the seatback pad; and the clip may be inserted through the communication portion and anchored to the edge portion of the opening.

The resin spring may be disposed along the seatback width direction between the pair of left and right side frames provided to the seatback frame. The seatback pad may be disposed on the front face side of the resin spring, and the clip may be attached to the seat cover that covers at least the front face side of the seatback pad. The clip may be inserted through the communication portion provided to the seatback pad and engaged with the edge portion of the opening formed in the resin spring. The seat cover of the seatback can accordingly be easily anchored to the resin spring through the clip.

The resin spring may be integrally provided to a seat back board that is made from resin and may be provided with a back board portion disposed at a back face side of the seatback frame.

The back board portion and the resin spring may be integrally provided to the seat back board that is made from resin, thereby enabling a reduction in the number of components and a reduction in assembly processes compared to when a seatback spring is made from metal, accordingly enabling a reduction in weight and a reduction in costs to be achieved. Moreover, since only the opening is formed to the resin spring in order to anchor the seat cover, any detriment to moldability can be avoided even in a configuration in which the resin spring is integrally formed to the back board portion.

A plurality of the resin springs may be provided so as to be separated from each other in a height direction of the seatback, the plural resin springs being provided with flexing portions formed with a wave shaped plan view cross-section by joining together plural curved faces along the seatback width direction, and the plural resin springs being set with a draft so as to enable removal from a mold in one of the seatback height directions.

Due to providing the back board portion to the seat back board, it is preferable to adopt a mold removal method in one of the seatback height directions in order to integrally form the plural resin springs to the back board portion using resin molding. In consideration of this point, in the present invention, the respective flexing portions formed to each of the resin springs may be set with a draft, enabling removal from the mold in one of the seatback height directions.

Intermediate portions of each of the pair of arm portions are provided with projection portions that project out in directions approaching each other.

When the base end sides of the pair of arm portions provided to the clip are brought towards each other, the projection portions provided to the intermediate portions of the pair of arm portions approach and contact each other. The leading end sides of the pair of arm portions thereby pivot about the projection portions and move apart from each other. A simple configuration can accordingly be achieved for the clip.

A back board portion that is formed from a resin plate member may be disposed on a back face side of a seatback frame; and a back spring section that is made from resin and is integral to the back board portion or integrally provided to the back board portion, that includes a resin spring disposed along a seatback width direction between a pair of left and right side frames provided to the seatback frame, and that is formed with an opening in the resin spring may be provided.

Due to integrally providing the back board portion and the resin spring to the seat back board that is made from resin, a reduction in the number of components and the number of assembly processes can be achieved in comparison to when a seatback spring is made from metal, thereby enabling a reduction in weight and a reduction in cost to be achieved. Moreover, since only the opening may be formed to the resin spring in order to anchor a seat cover, any detriment to moldability can be avoided even in a configuration in which the resin spring is integrally formed to the back board portion.

The resin spring may be provided with a flexing portion formed with a wave shaped cross-section profile; and the opening may be formed in the flexing portion.

A contribution can easily be made to the spring characteristics of the resin spring with a simple configuration due to providing the resin spring with the flexing portion formed with a wave shaped cross-section profile. Moreover, the spring constant of the resin spring can be easily varied by appropriately varying the setting for the position of the opening formed to the resin spring.

Both end portions of the resin spring may be fixed to the pair of side frames; and the opening may be formed at a location excluding both end portions and a central portion of the resin spring.

Both end portions of the resin spring may be fixed to the pair of left and right side frames of the seatback frame. Accordingly, similarly to with a support beam that is fixed at both ends, when load is input to a central side of the resin spring, stress is greatest at both end portions and the central portion of the resin spring. In the present invention, the opening for engaging a clip to the resin spring may be formed at a location excluding both end portions and the central portion of the resin spring. Namely, since the opening may be formed so as to avoid the locations at which stress is greatest, for example the resin spring can be set with a small width whilst still securing the strength and rigidity of the resin spring. It is accordingly possible to achieve a reduction in weight and a reduction in cost for the resin spring, and thereby for the seat back board.

A plurality of the resin springs may be provided so as to be separated from each other in a height direction of the back board portion, the plurality of resin springs being integrally provided with flexing portions formed with a wave shaped plan view cross-section by joining together plural curved faces along the back board portion width direction, and the plural resin springs being set with a draft so as to enable removal from a mold in one of the back board portion height directions.

Due to providing the back board portion it is preferable to adopt a mold removal method in one of the back board portion height directions in order to integrally form the plural resin springs to the back board portion using resin molding. In consideration of this point, in the present invention the respective flexing portions formed to each of the resin springs may be set with a draft, enabling removal from the mold in one of the back board portion height directions.

Advantageous Effects of Invention

As described above, in the vehicle seat and seat back board according to the present invention a seat cover can easily be anchored to a resin spring.

BRIEF DESCRIPTION OF DRAWINGS

FIG. 4 is an enlarged vertical cross-section illustrating an assembled state of the seatback illustrated in FIG. 1.

BEST MODE FOR CARRYING OUT THE INVENTION

First Exemplary Embodiment

Figure 1:
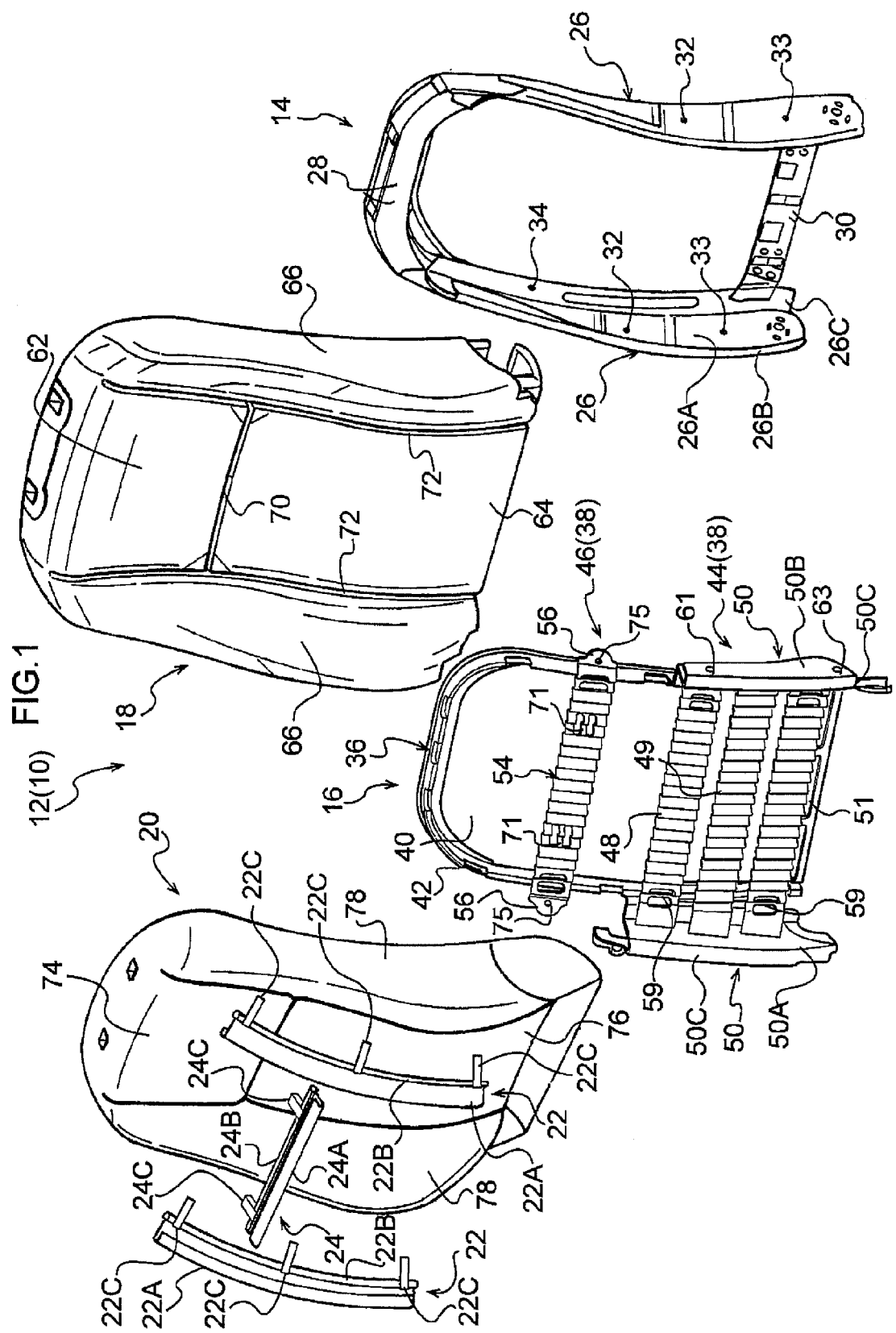
FIG. 1 is an exploded perspective view illustrating a seatback of a vehicle seat according to a first exemplary embodiment of the present invention.

Explanation follows regarding a first exemplary embodiment of a vehicle seat according to the present invention, with reference to FIG. 1 to FIG. 7. Note that in the drawings, the arrow FR indicates the vehicle front direction, the arrow UP indicates the vehicle upper direction, and the arrow W indicates the vehicle width direction as appropriate. The front-rear direction, the up-down direction, and the width direction (left-right direction) of the vehicle seat according to the present exemplary embodiment correspond to the front-rear direction, up-down direction, and width direction (left-right direction) of the vehicle.

Overall Configuration

FIG. 1 is an exploded perspective view illustrating a seatback 12 that is a backrest of a vehicle seat 10 of the present exemplary embodiment. Note that in FIG. 1, each of the elements are depicted as viewed from slightly different angles from each other. FIG. 4 is a vertical cross-section of the vehicle seat 10. As illustrated in FIG. 1 and FIG. 4, the vehicle seat 10 is configured from a seat cushion 11 (see FIG. 4) on which an occupant sits, the seatback 12 that is reclinably supported at a rear end portion of the seat cushion 11, and a headrest, not illustrated in the drawings, that is supported at an upper end portion of the seatback 12 so as to be capable of moving up and down. Note that in each of the drawings, the arrow A indicates the front direction of the seatback 12, and the arrow B indicates the height direction of the seatback 12 as appropriate. The width direction of the seatback 12 corresponds to the vehicle width direction (seat width direction) W.

As illustrated in FIG. 1, the seatback 12 includes a seatback frame 14 (seat frame) that is made from metal and configures a framework member of the seatback 12, a resin spring integral back board (referred to below simply as "seat back board") 16 that is mounted to a front face side of the seatback frame 14, a seatback pad 18 that configures a cushion member of the seatback 12 and that is attached from front side of the seat back board 16 and supported by the seatback frame 14, a cover (seat cover) 20 that covers the front face that is the main face of the seatback pad 18, and vertical direction attachment members 22 and a horizontal direction attachment member 24 for attaching the cover 20 to the seat back board 16. Detailed explanation follows regarding each configuration element.

Seatback Frame 14 Configuration

As illustrated in FIG. 1 to FIG. 4, the seatback frame 14 is configured in a rectangular frame shape as viewed from the front (meaning as viewed from the front of the vehicle). Specifically, the seatback frame 14 is configured from a pair of left and right side frames 26 disposed facing each other across the seatback width direction, an inverted U-shaped upper frame 28 that connects together upper end portions of the left and right side frames 26, and a lower frame 30 that connects together lower end portions of the left and right side frames 26 across the seatback width direction. The seatback 12 is manufactured by press forming the four members including the upper frame 28, however other frame structures may be adopted. For example, the upper frame alone may be configured from a pipe member bent into an inverted U-shape, or the upper frame and the pair of left and right side frames may be configured from a single pipe member bent into an inverted U-shape.

Figure 2:
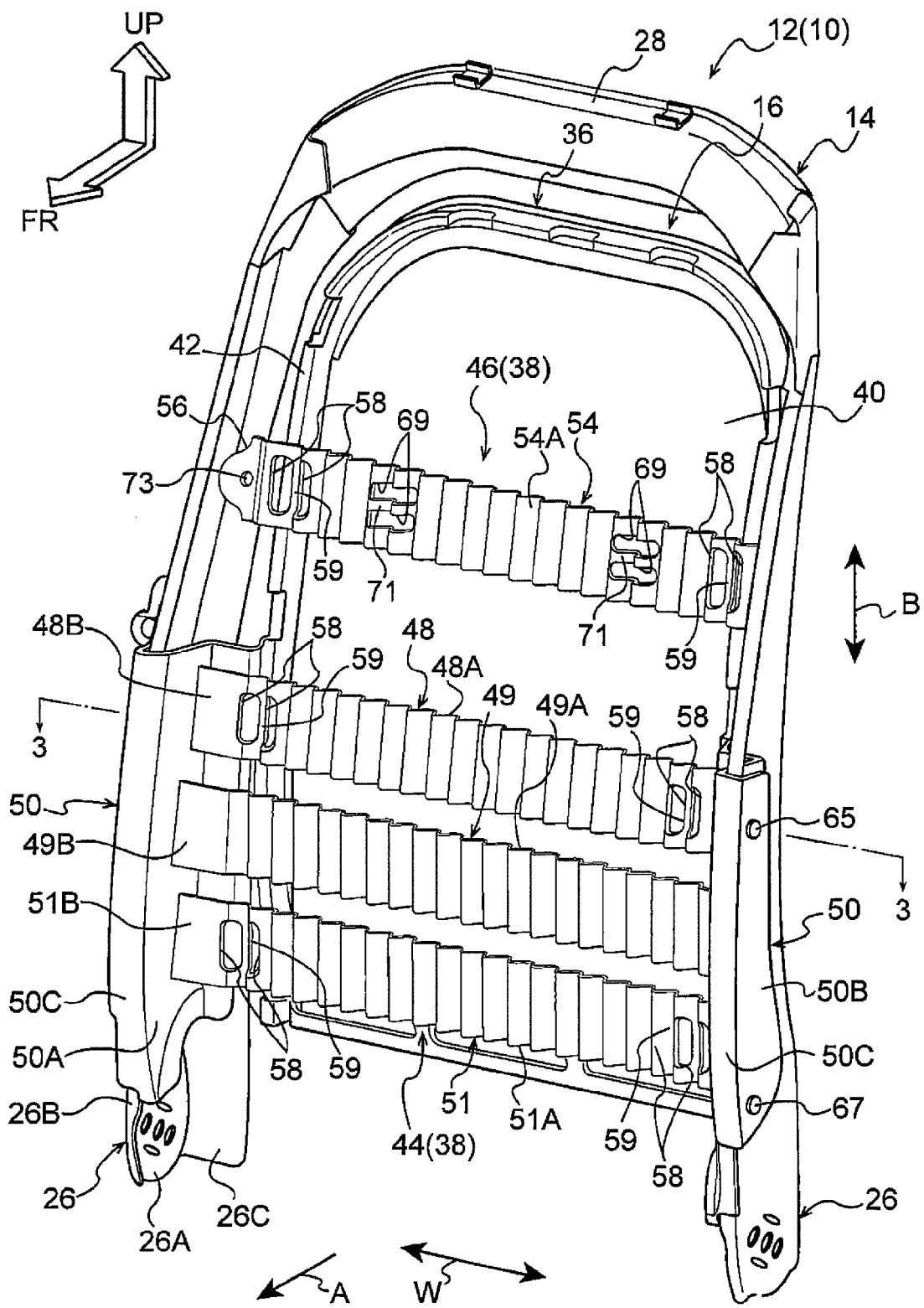
FIG. 2 is a perspective view illustrating an assembled state of the seat back board to the seatback frame illustrated in FIG. 1.
Figure 3:
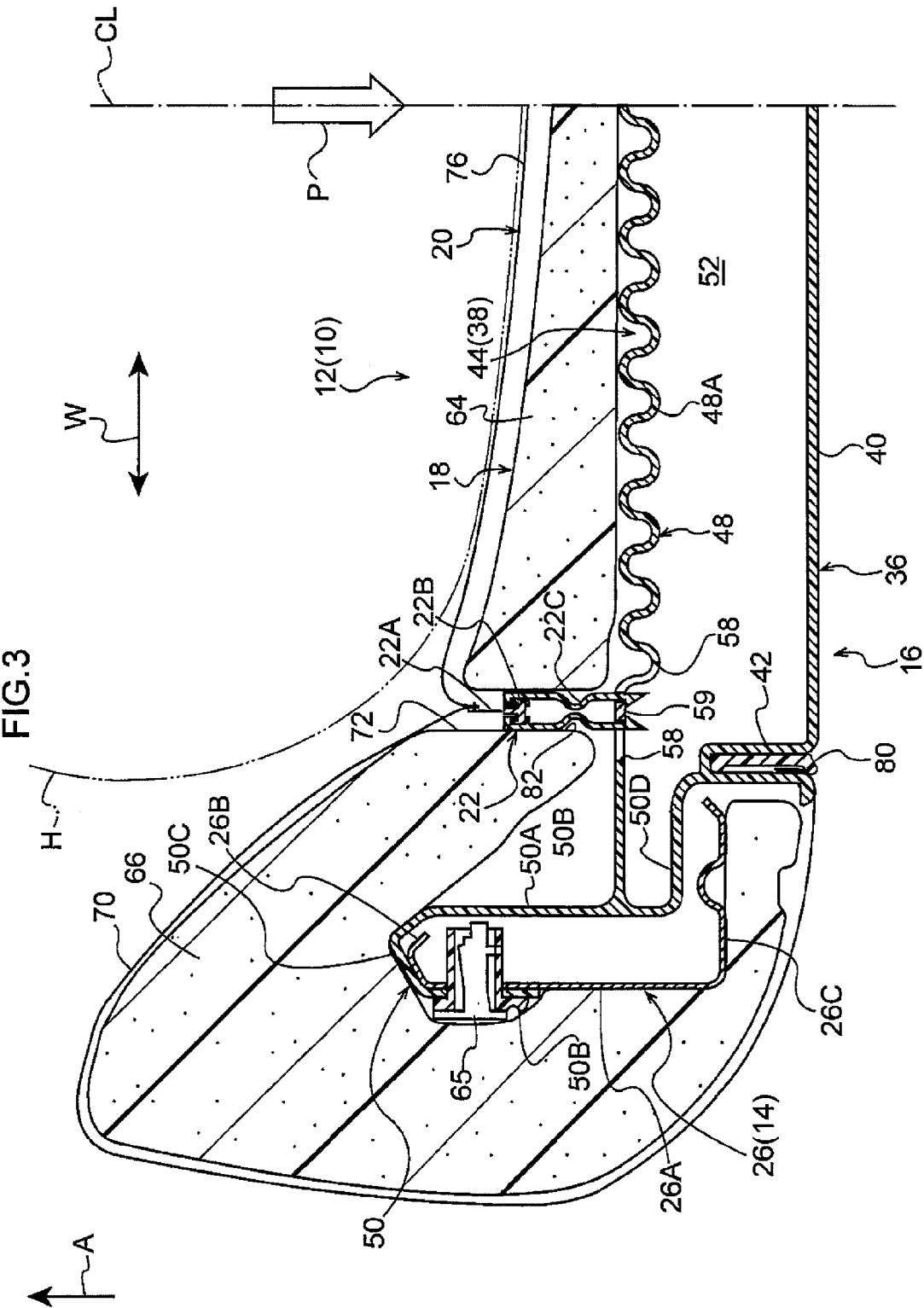
FIG. 3 is an enlarged plan view cross-section (an enlarged plan view cross-section taken along line 3-3 in FIG. 2) illustrating an assembled state of the seatback illustrated in FIG. 1.

Explanation follows regarding the cross-section structure of the left and right side frames 26. As illustrated in FIG. 2 and FIG. 3, the side frames 26 are respectively configured by a side wall portion 26A, a front wall portion 26B and a rear wall portion 26C, with an open cross-section profile that is open towards the seatback width direction inside. The side wall portion 26A is configured overall so as to narrow in width on progression from a lower end portion towards an upper end portion. A lower portion of the side wall portion 26A is formed with a pair of top and bottom attachment holes 32, 33 (see FIG. 1). The front wall portion 26B extends from a front edge of the side wall portion 26A towards the seatback width direction inside at a slight incline towards the front side, and then the front wall portion 26B extends towards the seatback width direction inside at a slight incline towards the rear side across a circular arc face. The rear wall portion 26C extends from a rear edge of the side wall portion 26A towards the seatback width direction inside. A bulging portion that bulges out in a circular arc shape towards the seatback front side is provided at a seatback width direction central portion of the rear wall portion 26C. A leading end portion of the rear wall portion 26 is bent so as to be inclined towards the seatback front side. The width of the rear wall portion 26C is set sufficiently wider than the width of the front wall portion 26B. An attachment hole 34 (see FIG. 1) is provided to an upper portion side of the rear wall portion 26C.

Seat Back Board 16 Configuration

Detailed explanation follows regarding the configuration of the seat back board 16 that configures a relevant portion of the vehicle seat 10 of the present exemplary embodiment. As illustrated in FIG. 1 to FIG. 4 (in particular in FIG. 1 and FIG. 2), the seat back board 16 includes a back board portion 36 that is formed from a resin plate member and is disposed at a back face side of the seatback frame 14, and a back spring section 38 (resin spring) that is made from resin and integrally provided to the back board portion 36, that is supported spanning between the pair of left and right side frames 26, that supports the seatback pad 18, and that is formed so as to be capable of undergoing flexing deformation in a load application direction (towards the seatback rear side) when load acts towards the seatback rear side.

The back board portion 36 is configured including a board body 40 that is formed slightly smaller than the seatback frame 14, and an anchor portion 42 integrally formed as a U-shaped groove to locations at an outer peripheral portion of the board body 40. More specifically, the board body 40 is formed slightly smaller than an inner peripheral edge of an opening portion of the rectangular frame shaped seatback frame 14. In an assembled state to the seatback frame 14, the board body 40 is disposed between and slightly towards the seatback rear side of the leading end portions (inner end portions) of the rear wall portions 26C of the left and right side frames 26. The board body 40 can accordingly be assembled to the seatback frame 14 from the front side (see FIG. 3). The cross-section profile of the anchor portion 42 is configured in a U-shape open towards the seatback rear side. The anchor portion 42 is employed to anchor an outer peripheral portion of the cover 20, however the anchor portion 42 also has a function of reinforcing the plate shaped board body 40 and increasing the rigidity of the overall back board portion 36.

The back spring section 38 is configured from a lower side back spring portion 44 integrally formed to a lower portion side of the back board portion 36, and an upper side back spring portion 46 integrally formed to an upper portion side of the back board portion 36. The upper side back spring portion 46 is provided independently, at a position separated from the lower side back spring portion 44 by a specific separation distance in the seatback height direction. The lower side back spring portion 44 is configured by 3 lower side back spring body portions 48, 49, 51 disposed in three parallel tiers along the seatback height direction (back board portion 36 height direction), and a pair of left and right lower side board side portions 50 (coupling and fixing portions) that respectively couple together both the seatback width direction (length direction) end portions of each of the three lower side back spring body portions 48, 49, 51 along the seatback height direction, and which are coupled to the backboard portion 36 and fixed to the side frames 26. Note that the number of the lower side back spring body portions configuring the lower side back spring portions 44 may be set as desired, and varied as appropriate based on a relationship with the required cushioning properties. Configuration may accordingly be made with a single lower side back spring body portion widened in the up-down direction, or configuration may be made with two, or four or more, plural lower side back spring body portions.

As illustrated in FIG. 2, the lower side back spring body portions 48, 49, 51 are configured with flexing portions 48A, 49A, 51A (general spring portions) at a seatback width direction central side. As viewed in plan view cross-section, the flexing portions 48A, 49A, 51A are respectively configured with wave shaped cross-sections by providing plural curved faces that are joined together along the seatback width direction (back board portion 36 width direction). The flexing portions 48A, 49A, 51A stretch when load acts towards the back board portion 36 side (seatback rear side). The lower side back spring body portions 48, 49, 51 accordingly undergo flexing deformation (resilient deformation) towards the back board portion 36 side that is the direction of load action. Flat portions 48B, 49B, 51B, respectively formed in flat plate shapes, are provided at both seatback width direction end portions of the respective lower side back spring body portions 48, 49, 51. Both seat width direction end portions of the respective flat portions 48B, 49B, 51B are integrally coupled to the pair of left and right lower side board side portions 50.

The two seatback width direction end portions of the flexing portions 48A, 51A of each of the upper tier and lower tier lower side back spring body portions 48, 51 are formed with sets of vertical opening 58 pairs (openings) that are adjacent to each other in the seatback width direction. The vertical openings 58 are formed with elongated rounded profiles oriented in the seatback height direction, and a vertical clip engagement portion 59 for anchoring the cover 20 is formed between the pairs of nearby left-right adjacent vertical openings 58. The vertical clip engagement portions 59 extend along the seatback height direction.

As illustrated in FIG. 3, the back board portion 36 is disposed at a position separated from the lower side back spring portion 44 by a specific separation distance towards the seatback rear side. Namely, a specific gap 52 is formed between the lower side back spring portion 44 and the back board portion 36. The lower side back spring body portions 48, 49, 51 are capable of undergoing resilient deformation within the range of the gap 52. Namely the back board portion 36 also functions as a limiting member that limits the deflection of the lower side back spring portion 44 to a specific amount or below.

The lower side board side portions 50 include inner walls 50A disposed to the seatback width direction inside of the side wall portions 26A of the side frames 26. The seatback width direction outside end portions of the lower side back spring body portions 48, 49, 51 are coupled to the inner walls 50A. The lower side board side portions 50 also include outer walls 50B disposed to the seatback width direction outsides of the side wall portions 26A of the side frames 26. The outer walls 50B are disposed parallel to the inner walls 50A and make contact with outside faces of the side wall portions 26A. The lower side board side portions 50 are moreover provided with front walls 50C that couple together front end portions of the inner walls 50A and the outer walls 50B at a front face side of the front wall portions 26B of the side frames 26, and rear side walls 50D that extend from rear end portions of the inner walls 50A towards the seatback width direction inside and are coupled to the back board portion 36.

Both seatback width direction end portions of the three top-to-bottom tiers of the lower side back spring body portions 48, 49, 51 are respectively coupled together by the pair of left and right lower side board side portions 50. Namely, although plural tiers of the lower side back spring body portions 48, 49, 51 are provided in the seatback height direction, the lower side back spring portion 44 is integrated to the back board portion 36 by coupling together both seatback width direction end portions of the lower side back spring body portions 48, 49, 51 with the pair of left and right lower side board side portions 50. Note that a length direction dimension of the respective lower side board side portions 50 is set so as to include a range from the upper edge of the upper tier lower side back spring body portion 48 to the lower edge of the lower tier lower side back spring body portion 51.

As illustrated in FIG. 1, the outer walls 50B of the lower side board side portions 50 are respectively formed with a pair of top and bottom through holes 61, 63. The upper side through hole 61 is disposed at the same height as the upper tier lower side back spring body portion 48, and the lower side through hole 63 is disposed at the same height as the lower tier lower side back spring body portion 51. The pair of top and bottom through holes 61, 63 are respectively disposed so as to face the pairs of top and bottom attachment holes 32, 33 formed in the side wall portions 26A of the side frames 26. The lower side board side portions 50 are fastened and fixed to the side frames 26 by fitting and anchoring clips 65, 67 (see FIG. 2 and FIG. 3) serving as fixing implements that are inserted into the through holes 61, 63 to the attachment holes 32, 33 from the seatback width direction outsides. Note that various other means may be adopted for fixing the lower side board side portions 50, such as a configuration wherein the lower side board side portions 50 are fastened to the side frames 26 using fixing implements (fasteners) such as rivets, screws, or bolts and weld nuts, or a configuration wherein the lower side board side portions 50 are adhered to the side frames 26 using a structural adhesive.

The upper side back spring portion 46 is of similar basic configuration to the lower side back spring portion 44, and is configured including an upper side back spring body portion 54 and upper side board side portions 56 (coupling and fastening portions). A flexing portion 54A (spring general portion) formed with a wave shaped plan view cross-section so as to stretch and undergo flexing deformation (resilient deformation) when load acts towards the back board portion 36 side (seatback rear side) is provided to a seatback width direction central side of the upper side back spring body portion 54.

Pairs of vertical openings 58, and vertical clip engagement portions 59 similar to the vertical openings 58 and the vertical clip engagement portions 59 formed to the lower side back spring body portions 48, 51 are formed to both seatback width direction end portions of the flexing portion 54A. Namely, a total of 6 sets of the vertical opening 58 pairs are formed to the seat back board 16, forming 6 of the vertical clip engagement portions 59.

Sets of horizontal opening 69 (openings) pairs adjacent to each other in the seatback height direction are respectively formed to both left and right sides of a seatback width direction intermediate portion of the flexing portion 54A. Each of the horizontal openings 69 is formed in an elongated rounded shape oriented in the seatback width direction, and a horizontal clip engagement portion 71 for anchoring the cover 20 is formed between the pairs of nearby up-down adjacent horizontal openings 69. The clip engagement portions 71 extend along the seatback width direction. Namely, the back spring section 38 (resin spring) is formed with the plural vertical clip engagement portions 59 and horizontal clip engagement portions 71 that extend in different directions to each other due to forming the sets of the vertical opening 58 pairs and the sets of the horizontal opening 69 pairs that are respectively adjacent to each other along different directions.

The upper side board side portions 56 are formed with shapes that jut out towards the seatback width direction outsides of the anchor portion 42, and are set with a length direction dimension so as to fit between the side wall portions 26A of the left and right side frames 26. Clips 73 (see FIG. 2) are inserted into the attachment holes 34 of the rear wall portions 26C from the seatback rear side and fitted into and anchored to through holes 75 (see FIG. 1) formed in the upper side board side portions 56, thereby fixing the upper side board side portions 56 to the side frames 26. Note that various means may be adopted for fixing the upper side board side portions 56, similarly to with the fixing method of the lower side board side portions 50.

Figure 5A:
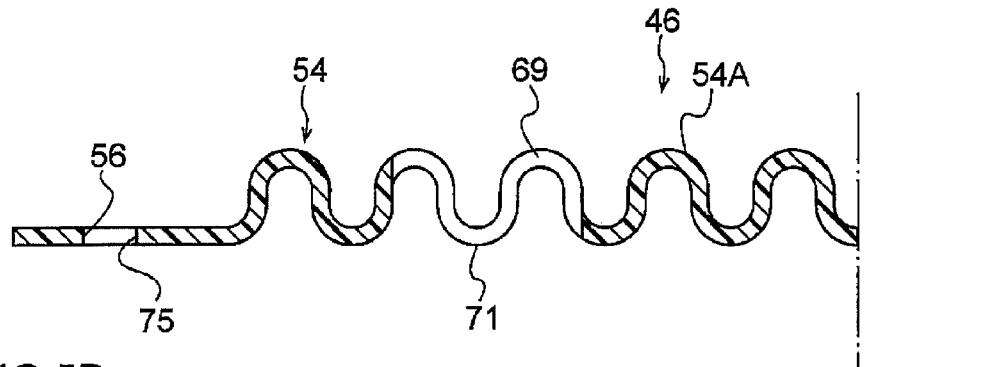
FIG. 5A is a plan view cross-section illustrating a partial configuration of an upper side back spring portion of a seat back board.
Figure 5B:
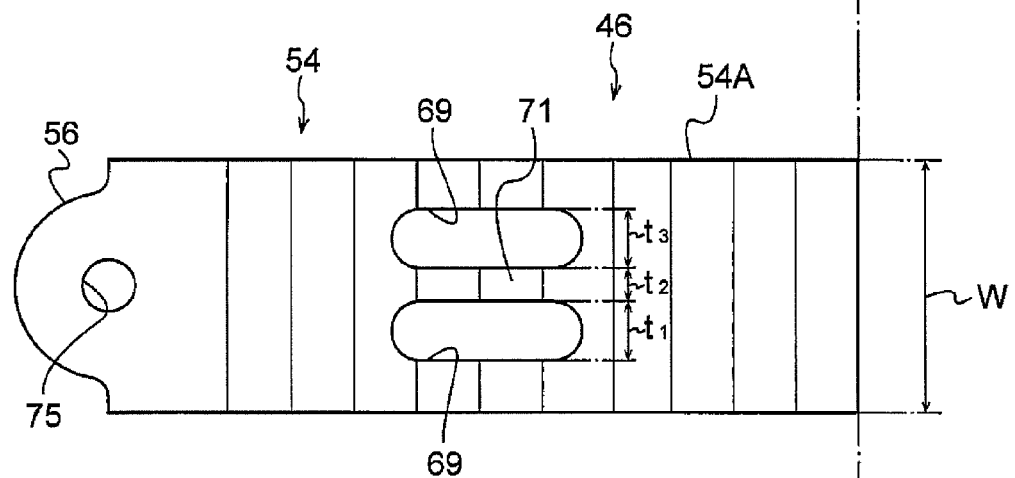
FIG. 5B is a front-on view illustrating a partial configuration of the upper side back spring portion.
Figure 5C:
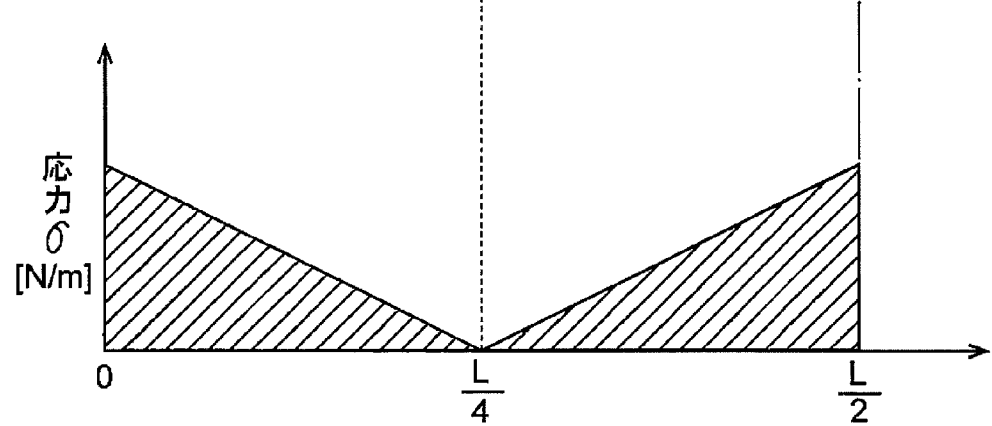
FIG. 5C is a distribution diagram of stress arising in the upper side back spring portion.

The sets of horizontal opening 69 pairs described above are formed at locations excluding both seat width direction end portions and the seat width direction central portion of the upper side back spring portion 46 (back spring section 38). Specifically, as illustrated in FIG. 5A and FIG. 5B, each of the horizontal openings 69 are formed at central portions between the seatback width direction center of the upper side back spring portion 46 and the centers of the through holes 75 (clips 73) that are fixing positions of the upper side back spring portion 46 to the side frames 26. In other words, each of the horizontal openings 69 is formed so as to be positioned centered the centers (L/4, 3L/4 positions: where L is the length between the centers of the left and right through holes 75) between the seatback width direction center of the upper side back spring portion 46 (L/2 position) and the positions of the centers of the through holes 75 (0, L positions). Note that in FIG. 5B, W indicates an up-down width dimension of the upper side back spring portion 46, t1 and t3 indicate up-down width dimensions of the horizontal openings 69, and t2 indicates an up-down width dimension of the horizontal clip engagement portion 71. Moreover, FIG. 5A and FIG. 5B only illustrate the seatback right side half of the upper side back spring portion 46 in consideration of the size of the drawings, with illustration of the horizontal openings 69 formed at the 3L/4 position being omitted. In the interests of ease of explanation, FIG. 5A and FIG. 5B also omit illustration of the vertical openings 58 and the vertical clip engagement portions 59.

Seatback Pad 18 Configuration

As illustrated in FIG. 1, the seatback pad 18 is broadly speaking configured by a pad central upper portion 62, a pad central lower portion 64, and a pair of left and right pad side portions 66. Note that the seatback pad 18 is manufactured from, for example, a urethane foam.

As illustrated in FIG. 4, the vertical cross-section profile of the pad central upper portion 62 is formed substantially in a top-bottom and left-right inverted J-shape. The pad central upper portion 62 is anchored to the upper frame 28 of the seatback frame 14 from the seatback upper side. The vertical cross-section profile of the pad central lower portion 64 is formed substantially in a left-right inverted J-shape. The pad central lower portion 64 forms a shape with a lower portion with a curved projecting profile that bulges further towards the seat front side than an upper portion. The pad central lower portion 64 is anchored from the seatback lower side to a connecting rod 68 that couples together lower end portions of the side frames 26 along the seat width direction. Note that the connecting rod 68 is disposed parallel to the front side of the lower frame 30 of the seatback frame 14.

Moreover, as illustrated in FIG. 3, the pad side portions 66 are respectively configured with a substantially C-shaped profile in horizontal cross-section. The pad side portions 66 are mounted to the side frames 26 so as to wrap around the side frames 26 to which the lower side board side portions 50 have been mounted. Note that the respective pad side portions 66 are configured with a shape wherein a lower portion with a projecting curved face profile bulges further towards the seatback front side than an upper portion. The pad side portions 66 bulge further towards the seatback front side than the pad central upper portion 62 and the pad central lower portion 64, thereby configuring a shape that secures side support for an occupant H.

Returning to FIG. 4, viewed in vertical cross-section, the seat back board 16 is disposed so as to span from a back face side lower end portion 62A of the pad central upper portion 62 to a back face side upper end portion 64A of the pad central lower portion 64. To be precise, the back face side upper end portion 64A of the pad central lower portion 64 is formed thinner than the back face side lower end portion 62A, with a lower end portion of the back board portion 36 disposed front-rear superimposed with the thinned portion.

A horizontal direction groove 70 configuring a portion of a communication portion for tucking in the cover is formed between the pad central upper portion 62 and the pad central lower portion 64 described above. A pair of left and right vertical grooves 72 configuring portions of the communication portion for tucking in the cover are respectively formed between the pad central upper portion 62 and pad central lower portion 64 and the pad side portions 66. Each of the horizontal direction groove 70 and the vertical grooves 72 are formed in straight line shapes, and the groove widths of the horizontal direction groove 70 and the vertical grooves 72 are set with a length that allows insertion of the vertical direction attachment member 22 and the horizontal direction attachment member 24. Plural (3 in the present example) through holes 82 (see FIG. 3 and FIG. 6) into which clips 22C, described later, are inserted are formed at seatback height direction separations at a bottom side of the vertical grooves 72, such that the front face side and the rear face side of the seatback pad 18 are placed in communication with each other through the through holes 82 and the vertical grooves 72. Similarly, plural (2 in the present example) through holes 84 (see FIG. 4) through which clips 24C, described later, are inserted are formed at seatback width direction separations at a bottom side of the horizontal direction groove 70, such that the front face side and the rear face side of the seatback pad 18 are placed in communication with each other through the through holes 84 and the horizontal direction groove 70.

Cover 20 Configuration and Attachment Structure

As illustrated in FIG. 1, the cover 20 is formed in a size capable of covering the seatback pad 18 from the front face side. The cover 20 is moreover provided with a cover central upper portion 74, a cover central lower portion 76, and a pair of left and right cover side portions 78, corresponding to the split configuration of the seatback pad 18. The cover 20 is attached to the seat back board 16 by the vertical direction attachment members 22, the horizontal direction attachment member 24, and the vertical clip engagement portions 59 and the horizontal clip engagement portions 71 of the seat back board 16.

As illustrated in FIG. 1, the vertical direction attachment members 22 are configured by strap shaped coupling cloths 22A, elongated clip attachment portions 22B (suspenders) made from resin and provided to one side edges of the coupling cloths 22A, and plural (3 each in the present example) resin clips 22C (anchor means) attached to the clip attachment portions 22B. The other side edges of the coupling cloths 22A are attached in advance by sewing to the cover central upper portion 74, the cover central lower portion 76, and the cover side portions 78. The coupling cloths 22A are inserted into the vertical grooves 72 of the seatback pad 18 together with the clip attachment portions 22B (see FIG. 3 and FIG. 6). Note that in FIG. 1 the vertical direction attachment members 22 (and the horizontal direction attachment member 24) are depicted as separate to the cover 20, however the vertical direction attachment members 22 (and the horizontal direction attachment member 24) are attached in advance to the cover 20 as described above.

Figure 6:
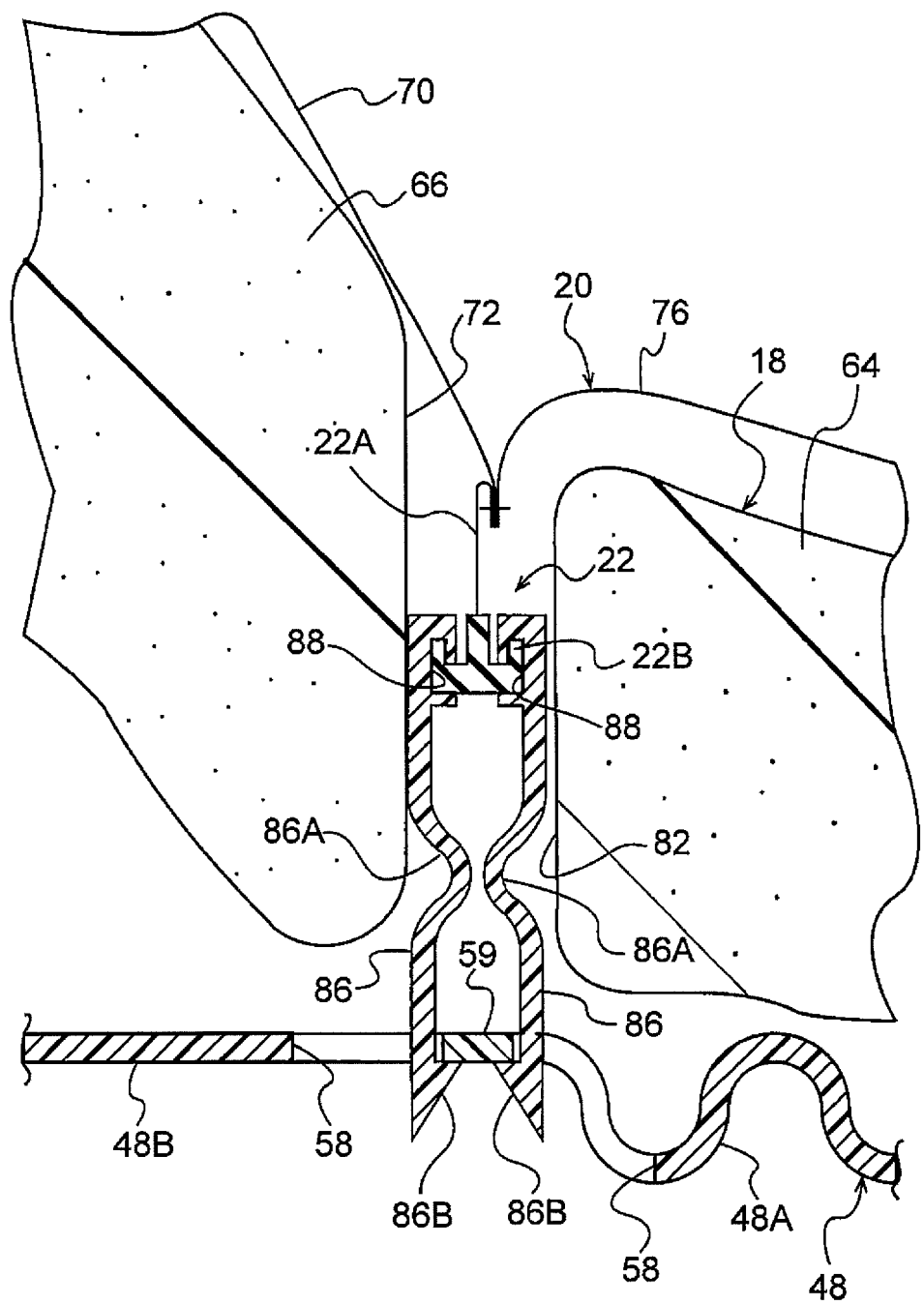
FIG. 6 is an enlarged plan view cross-section illustrating a portion of FIG. 3.
Figure 7:
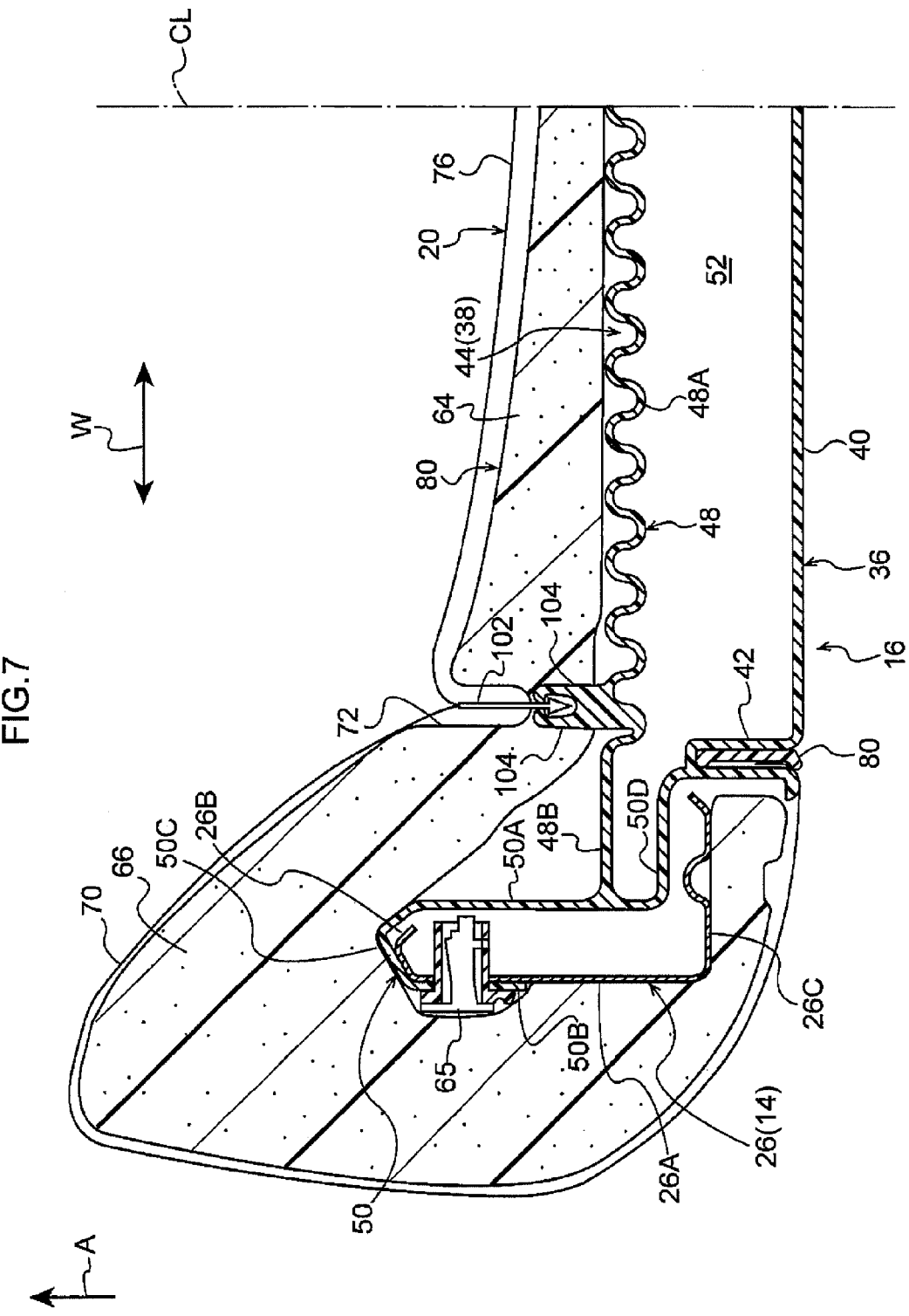
FIG. 7 is a plan view cross-section corresponding to FIG. 3, illustrating a Comparative Example to the first exemplary embodiment of the present invention.

The plural clips 22C are disposed at separations from each other in the seatback height direction. As illustrated in FIG. 6, each of the clips 22C is provided with a pair of elongated arm portions 86 (gripping portions) formed from a resin material. Base end portions (length direction one end portions) of the pair of arm portions 86 are formed with fitting grooves 88. The fitting groove 88 of one of the arm portions 86 slide fits together with one side side portion of the clip attachment portion 22B, and the fitting groove 88 of the other of the arm portions 86 slide fits together with the other side side portion of the clip attachment portion 22B. The arm portions 86 are thereby attached to the clip attachment portion 22B, with the length direction other end sides (leading end sides) of the pair of arm portions 86 extending parallel to each other from the clip attachment portion 22B towards the opposite side to the coupling cloth 22A. Note that the attachment method of the pair of arm portions 86 to the clip attachment portion 22B may be varied as appropriate, and for example the arm portions 86 may be integrally formed by insert molding. Projection portions 86A of circular arc shaped cross-section profile that project out (bulge out) towards mutually approaching sides (opposing sides) are provided at length direction intermediate portions of the pair of arm portions 86. Hook portions 86B of triangular cross-section that project out towards mutually approaching sides (opposing sides) are provided to the length direction other end portions (leading end portions) of the pair of arm portions 86.

The plural clips 22C described above are inserted into the through holes 82 formed at the bottom sides of the vertical grooves 72, with the leading end portions of the pair of arm portions 86 projecting towards the seatback pad 18 rear face side. The clips 22C resiliently engage with each of the vertical clip engagement portions 59 (edge portions of the sets of the opening 58 pairs) along the seatback width direction. Namely, the leading end portions of the pair of arm portions 86 are inserted into the respective openings 58 of the sets of the vertical opening 58 pairs, and the vertical clip engagement portion 59 of the seat back board 16 is gripped between the leading end portions of the pair of arm portions 86. The hook portions 86B of each of the arm portions 86 hook onto the vertical clip engagement portions 59. Each of the clips 22C is thus anchored to the seat back board 16. The central portion of the cover 20 is thereby attached to the seat back board 16 in the vertical direction. Note that the clips 22C are set with a sufficiently smaller seatback height direction dimension than the vertical openings 58, and the clips 22C are capable of relative movement with respect to the seat back board 16 in the seatback height direction within the range of the openings 58.

Note that during anchoring of the clips 22C to the vertical clip engagement portions 59 in the vertical direction, the leading end sides of the pair of arm portions 86 resiliently deform in directions moving away from each other due to inclined faces provided to the hook portions 86B of the arm portions 86 being pushed against the vertical clip engagement portion 59. The leading end sides of the pair of arm portions 86 then resiliently recover such that the respective hook portions 86B hook onto the vertical clip engagement portions 59. Moreover, in the clips 22C the projection portions 86A provided at length direction intermediate portions of the pair of arm portions 86 make contact with each other when the base end sides of the pair of arm portions 86 are pinched so as to approach each other. From this state, by further pinching the base end sides of the pair of arm portions 86 such that they approach each other even more, the leading end sides of the pair of arm portions 86 pivot about the respective projection portions 86A so as to move away from each other. It is accordingly possible to release the hooked state of the respective hook portions 86B to the vertical clip engagement portions 59 (namely the anchored state of the clips 22C to the vertical clip engagement portions 59), and remove the clips 22C from the seat back board 16.

As illustrated in FIG. 1, the horizontal direction attachment member 24 is configured by a strap shaped coupling cloth 24A, an elongated clip attachment portion 24B that is made from resin and provided to one side edge of the coupling cloth 24A, and plural (2 in the present example) resin clips 24C (anchor means) attached to the clip attachment portion 24B. The basic configuration is similar to that of the vertical direction attachment member 22. The other side edge of the coupling cloth 24A is attached in advance by sewing to the cover central upper portion 74 and the cover central lower portion 76. The plural clips 24C are configured similarly to the clips 22C, and are disposed separated from each other along the seatback width direction. The clips 24C resiliently engage in the seatback height direction with the pair of left and right horizontal clip engagement portions 71 (edge portions of the sets of the opening 69 pairs) formed to the back spring body portion 54 of the seat back board 16, thereby attaching a central portion of the cover 20 to the seat back board 16 in the horizontal direction. Namely, in the present exemplary embodiment, the plural clips 22C, 24C attached on the cover 20 side are anchored to the seat back board 16, thereby positioning the seatback pad 18 with respect to the seat back board 16 in the seatback width direction and the seatback height direction. Note that the anchoring method and anchor release method of the clips 24C to the horizontal clip engagement portions 71 are similar to those of the clips 22C. The clips 24C are moreover set with a dimension along the seatback width direction that is sufficiently smaller than that of the openings 69, such that the clips 24C are capable of relative movement with respect to the seat back board 16 in the seatback width direction within the range of the openings 69.

Arrowhead shaped outer peripheral anchor portions 80 are attached to appropriate positions of outer peripheral portions of the cover 20 by sewing. The outer peripheral anchor portions 80 are inserted and anchored to the anchor portion 42 of the back board portion 36 from the vehicle rear side. The outer peripheral portions of the cover 20 are thereby anchored to the back board portion 36.

Operation and Advantageous Effects of the Present Exemplary Embodiment Explanation follows regarding operation and advantageous effects of the present exemplary embodiment.

The vehicle seat 10 configured as described above is provided with the seat back board 16 with the resin back spring section 38 (resin spring) integrally formed to the resin back board portion 36. The seat back board 16 is fitted together with the metal seatback frame 14 from the seatback front side. Specifically, the left and right board side portions 50 are fitted together with the left and right side frames 26 from the seatback front side, and in this state the board side portions 50 are fixed to the side frames 26 from the seatback width direction outside. Next, the seatback pad 18 is mounted to the seatback frame 14 from the seatback front side, and then the cover 20 is covered over the seatback pad 18. The vertical direction attachment members 22 and the horizontal direction attachment member 24 are attached to the cover 20 in advance by sewing, and the clips 22C of the vertical direction attachment members 22 and the clips 24C of the horizontal direction attachment member 24 are engaged with the corresponding vertical clip engagement portions 59 and the horizontal clip engagement portions 71 whilst covering the cover 20 over the seatback pad 18. The outer peripheral anchor portions 80 of the cover 20 are then anchored to the anchor portion 42 back board portion 36.

The seat cushion 11 and the headrest, not illustrated in the drawings, are attached to the thus assembled seatback 12 to configure the vehicle seat 10. When the occupant H (see FIG. 3) sits in the vehicle seat 10, a load P towards the seatback rear side is input to the back spring section 38 through the cover 20 and the seatback pad 18. The lower side back spring body portions 48, 49, 51 and the upper side back spring body portion 54 accordingly undergo flexing deformation towards the seatback rear side that is the direction of load action. When this occurs, the load P is transmitted from the left and right board side portions 50 to the left and right side frames 26, such that a reaction force from the side frames 26 towards the seatback front side arises.

When the load P is thus input from the occupant H to the back spring section 38, the back spring section 38 itself undergoes flexing deformation, thereby making a contribution towards securing the cushioning properties of the seatback 12. The load P itself is transmitted to the left and right side frames 26 and supported by the left and right side frames 26. As a result, adequate cushioning performance can be secured in the seatback 12. The back spring section 38 is moreover integrally provided with the resin-formed back board portion 36, thus enabling the number of components and the number of assembly steps to be reduced in comparison to when the back spring section 38 is configured by a metal seatback spring. As a result, according to the present exemplary embodiment adequate cushioning performance can be secured for the seatback 12, whilst also enabling a reduction in weight and reduction in costs to be achieved.

Moreover, in the present exemplary embodiment, the plural clips 22C, 24C attached to the cover 20 side are engaged with the vertical clip engagement portions 59 and the horizontal clip engagement portions 71 of the seat back board 16, thereby enabling the cover 20 to be anchored to the back spring section 38 of the seat back board 16. An anchoring operation of the cover 20 to the back spring section 38 (resin spring) can accordingly be made easier than with conventional anchoring structures employing for example hog rings. Moreover, a reduction in weight can be achieved for the vehicle seat since metal hog rings can be omitted. Since the vertical clip engagement portions 59 and the horizontal clip engagement portions 71 are provided to the back spring section 38 of the seat back board 16 simply by forming the openings 58, 69, any detriment to the moldability of the back spring section 38 can be avoided.

Moreover, in the present exemplary embodiment, when the pairs of arm portions 86 provided to the clips 22C, 24C are inserted into the respective sets of the opening 58, 69 pairs, the hook portions 86B formed at the leading end sides of the pairs of arm portions 86 hook onto the vertical clip engagement portions 59 and the horizontal clip engagement portions 71 formed in the sets of the opening 58, 69 pairs. The cover 20 to which the clips 22C, 24C are attached can accordingly be easily anchored to the seat back board 16. Moreover, by moving the pair of arm portions 86 apart from each other, the clips 22C, 24C, namely the cover 20, can be removed from the seat back board 16. An operation to remove the anchor means (namely the cover 20) from the seat back board 16 can accordingly be made easier than for example when an arrowhead shaped anchor means is inserted into a single opening and anchored to edge portions of the opening.

Moreover, in the present exemplary embodiment configuration is made such that when the base end sides of the pair of arm portions 86 of the clips 22C, 24C are brought towards each other, the leading end sides of the pair of arm portions 86 move apart from each other by pivoting about intermediate portions of the pair of arm portions 86 (the projection portions 86A). Since the anchored state of the clips 22C, 24C (hooked state of the hook portions 86B) with respect to the vertical clip engagement portions 59 and the horizontal clip engagement portions 71 can be released, the clips 22C, 24C, namely the cover 20, can easily be removed from the seat back board 16. Replacement of the cover 20, for example, can accordingly be performed easily. The leading end sides of the clips 22C, 24C can moreover be moved apart from each other simply by pivoting about the projection portions 86A provided at the intermediate portions of the pair of arm portions 86, thereby achieving an extremely simple configuration for the clips 22C, 24C.

In the present exemplary embodiment, the back spring section 38 of the seat back board 16 is provided with the flexing portions 48A, 49A, 51A, 54A that are formed with wave shaped cross-section profiles. A contribution can accordingly easily be made to the spring properties of the back spring section 38 with a simple configuration. The spring constant of the back spring section 38 can moreover be easily varied by appropriately varying the settings for the positions of the openings 58, 59 formed to the back spring section 38. Namely, in the present exemplary embodiment, due to integrating together a structure for anchoring the cover 20 to the back spring section 38 and a structure for varying the spring constant, a reduction in weight and reduction in cost can be achieved for the back spring section 38.

Moreover in the present exemplary embodiment, both seatback width direction end portions of the upper side back spring portion 46 are supported (fixed) on the side frame 26 side of the seatback frame 14. Accordingly, similarly to with a support beam that is fixed at both ends, when the load P (see FIG. 3) is input to the seat width direction central side of the upper side back spring portion 46, stress is greatest at both seatback width direction end portions and the seatback width direction central portion of the upper side back spring portion 46, and stress is lowest between both seatback width direction end portions and the seatback width direction central portion of the upper side back spring portion 46 (see FIG. 5C). In this respect, in the present exemplary embodiment, since the horizontal openings 69 are formed between both seatback width direction end portions and the seatback width direction central portion of the upper side back spring portion 46, namely at locations where the stress/load is lowest, the width, for example, of the upper side back spring portion 46 can be set small whilst still securing the strength and rigidity of the upper side back spring portion 46. It is accordingly possible to achieve a reduction in weight and a reduction in cost of the upper side back spring portion 46, and thus for the vehicle seat 10. Note that the vertical openings 58 can obtain similar advantageous effects to those described above, since the vertical openings 58 are formed at locations excluding both seatback width direction end portions and the seatback width direction central portion of the upper side back spring portion 46 and the lower side back spring portion 44.

Due to having a small width W for the upper side back spring body portion 54, it is possible to regulate the flexing of the upper side back spring portion 46. Namely, when the input load to the spring is P, the spring length is L, the Young's modulus of the spring is E, and the cross-section secondary moment of the spring is I, then the spring deflection $\delta$ can be derived by the formula $PL^3/48EI$. Since the spring deflection $\delta$ is proportional to $1/W$, by reducing W (the width of the spring), a larger spring deflection $\delta$ can be secured. This point is also true for the lower side back spring body portions 48, 49, 51 of the lower side back spring portion 44.

Moreover, in the present exemplary embodiment, the plural clips 22C and clips 24C attached to the cover 20 side are anchored to the seat back board 16, the cover 20 thereby positioning the seatback pad 18 in the seatback width direction and the seatback height direction (in 2 directions) with respect to the seat back board 16. Unintentional positional displacement of the seatback pad 18 with respect to the seat back board 16 can accordingly be suppressed. Moreover, the engagement direction of the clips 22C with respect to the vertical clip engagement portions 59 is configured in the seatback width direction, with a different engagement direction set for the clips 24C with respect to the horizontal clip engagement portions 71. Additionally, the clips 22C are configured so as to be capable of relative movement in the seatback height direction with respect to the seat back board 16 within the range of the openings 58, and the clips 24C are configured so as to be capable of relative movement in the seatback width direction with respect to the seat back board 16 within the range of the openings 69. The seatback pad 18 can accordingly be positioned in the seatback width direction and the seatback height direction with respect to the seat back board 16 whilst the relative movement of the clips 22C, 24C described above absorbs any variation in the assembly of the seatback pad 18 to the seat back board 16. Easy manufacture for the vehicle seat can accordingly be achieved.

Moreover, in the present exemplary embodiment, the resin seat back board 16 is integrally provided with the board body 40 and the back spring section 38, however good moldability can still be secured for the seat back board 16 since only the openings 58, 59 are formed in the back spring section 38. Namely, for the anchoring structure of the cover 20 and the back spring section 38, a configuration may be considered wherein, as in the Comparative Example illustrated in FIG. 7, a pair of hook portions 104 are formed projecting out from the back spring section 38 and engagement portions 102 of arrow shaped cross-section coupled on the cover 20 side resiliently engage with the pair of hook portions 104. However, in such a configuration, the hooking shape at the leading end sides of the hook portions 104 forms an undercut with respect to the direction of removal from a mold, necessitating the use of a mold core. Moreover, removal is difficult once the engagement portions 102 have been engaged with the hook portions 104, making replacement of the cover 20, for example, more complicated. In this respect, in the present exemplary embodiment adopting the openings 58, 69 secures good moldability, whilst adopting the clips 22C, 24C enables easy attachment and removal to be achieved for the cover 20.

Second Exemplary Embodiment

Figure 8:
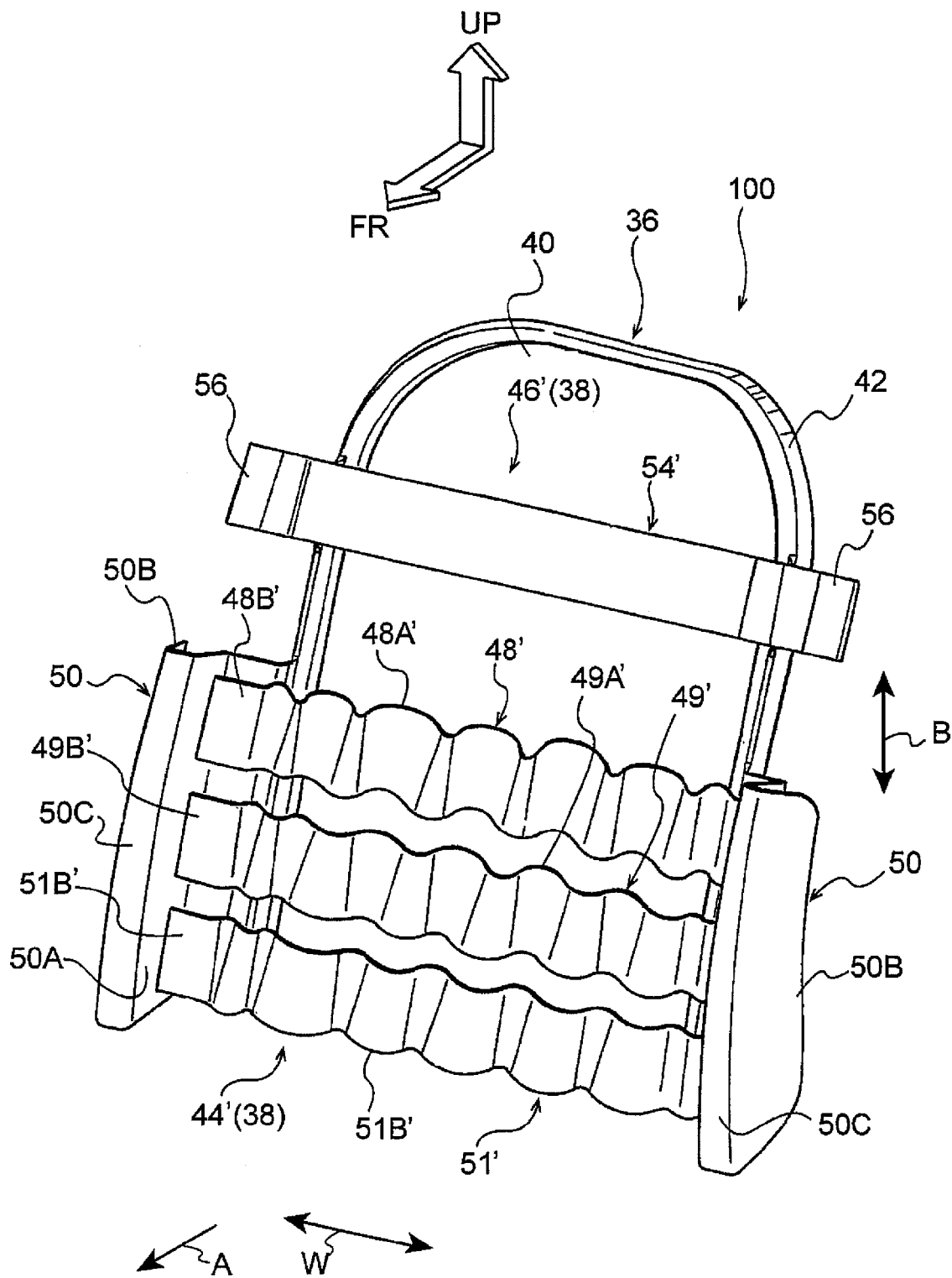
FIG. 8 is a perspective view illustrating a seat back board according to a second exemplary embodiment of the present invention.
Figure 9:
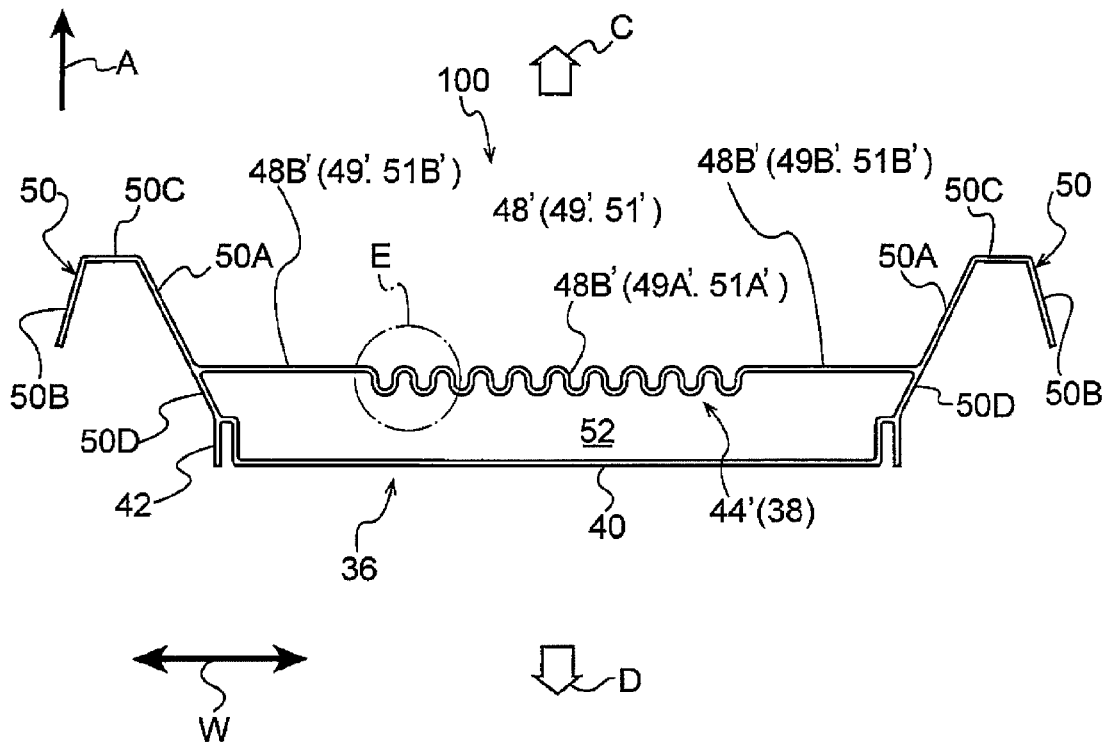
FIG. 9 is a plan view cross-section illustrating the seat back board illustrated in FIG. 8.
Figure 10:
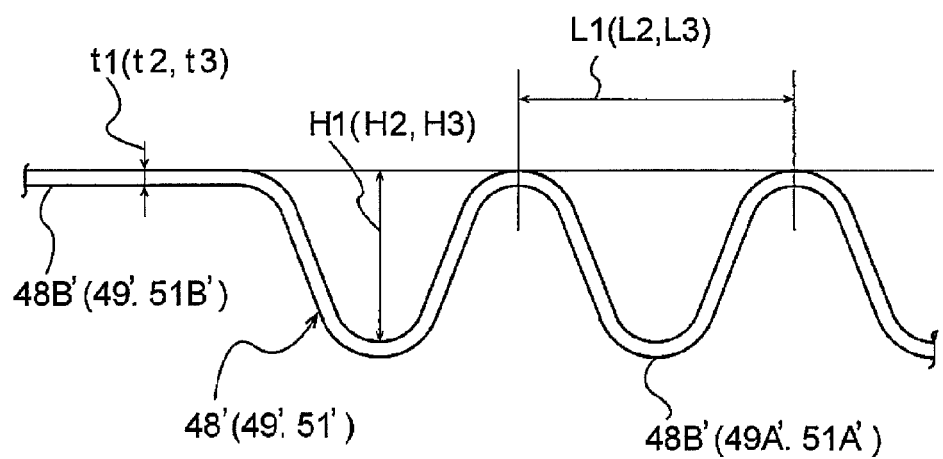
FIG. 10 is an enlarged plan view cross-section illustrating the range indicated by the letter E in FIG. 9.

Explanation follows regarding a second exemplary embodiment of the present invention with reference to FIG. 8 to FIG. 10. Note that configuration portions similar to those of the first exemplary embodiment described above are allocated the same reference numerals and explanation thereof is omitted.

As illustrated in FIG. 8 and FIG. 9, a seat back board 100 of the second exemplary embodiment is of similar basic configuration to the seat back board 16 according to the first exemplary embodiment. However, in the seat back board 100, only the lower side back spring portion 44' is integrally resin molded to the back board portion 36. An upper side back spring portion 46' is integrated to the back board portion 36 by thermal welding. When flexing portions 48A', 49A', 51A' (wave shaped portions) of lower side back spring body portions 48', 49', 51' of the lower side back spring portion 44' are being molded from resin in a slide mold, not illustrated in the drawings, a draft (tapered profile) is set so as to allow the slide mold to be removed along the seatback height direction.

To explain further, in the present exemplary embodiment, as illustrated in FIG. 10, where H1, H2, H3 are the spring depth, L1, L2, L3 are the spring pitch, and t1, t2, t3 are the spring plate thickness of the respective lower side back spring body portions 48', 49', 51', a difference in profiles between the lower side back spring body portions 48', 49', 51' is set so as to give the following relationships (1) to (3). In other words, between them the lower side back spring body portions 48', 49', 51' satisfy the relationships (1) to (3) below and the lower side back spring body portions 48', 49', 51' are respectively set with the draft mentioned above.

$$H1<H2<H3 \quad (1)$$

$$L1<L2<L3 \quad (2)$$

$$t1<t2<t3 \quad (3)$$

Note that in FIG. 8, the tapered profiles of the flexing portions 48A', 49A', 51A' are illustrated in a significantly exaggerated manner. In FIG. 8, the flexing portion (wave shaped portion) of the upper side back spring body portion 46' is omitted from illustration, however since the upper side back spring portion 46' is attached to the back board portion 36 at a later stage, the upper side back spring portion 46' may be applied with a desired wave shape, or a decision may be made not to apply a wave shape.

By considering the upper side board side portions 56 (coupling and fixing portions) provided to both end portions of the upper side back spring portion 46' as extension portions of the lower side board side portions 50 of the lower side back spring portion 44', both the lower side back spring portion 44' and the upper side back spring portion 46' may be integrally formed to the back board portion 36. In such cases, since the flexing portion of the upper side back spring portion 46' is also formed with a tapered profile, the draft of the flexing portion of the upper side back spring portion 46' should be considered together with that of the flexing portions 48A', 49A', 51A' of the lower side back spring portion 44'.

The openings 58, 69, the vertical clip engagement portions 59, and the horizontal clip engagement portions 71 are omitted from illustration in FIG. 8 to FIG. 10, however configuration other than that described above is similar to the configuration of the first exemplary embodiment.

Operation and Advantageous Effects

According to the above configuration, similar operation and advantageous effects are obtained to in the first exemplary embodiment described above. In addition, the following operation and advantageous effects are obtained in the present exemplary embodiment. Namely, in the seat back board 100, the lower side back spring portion 44' is integrally molded with the back board portion 36. Accordingly, in manufacture of the seat back board 100, when a general molding method is employed for removing the mold to the front side of the seat back board 100 (see arrow C in FIG. 9) and to the rear side of the seat back board 100 (see arrow D in FIG. 9), an undercut area arises in a gap 52 between the lower side back spring portion 44' and the back board portion 36. When an integral slide mold is employed in an attempt to mold this area, it is necessary to employ a method wherein the slide mold is removed in either height direction of the seat back board 100, however in such cases there is a need to design each of the lower side back spring body portions 48', 49', 51' with profiles allowing removal from the slide mold.

With regards to this point, since in the present exemplary embodiment the flexing portions 48A', 49A', 51A' of the lower side back spring body portions 48', 49', 51' are set with a draft and with different profiles, the slide mold can be easily removed to the seatback height direction upper side even when an integral slide mold is employed. As a result, the seat back board 100 can be manufactured efficiently, and a reduction in cost can be achieved for the mold.

Supplementary Explanation of the Above Exemplary Embodiments

In each of the above exemplary embodiments, the resin back spring section 38 (resin spring) is integrally formed to the resin back board portion 36, however embodiments are not limited thereto, and the back board portion and the resin spring may be formed separately. The resin spring may also be integrally provided to the resin back board portion. Namely, the back board portion and the resin spring may be manufactured separately and then integrated by for example welding. The back spring body portions and the board side portions configuring the resin spring may also be manufactured as separate components and then integrated together by for example welding. Moreover, in each of the above exemplary embodiments, explanation has been given wherein the coupling and fixing portions 50 are configured as back spring section 38 side configuration elements, however the coupling and fixing portions 50 may also be treated as back board portion 36 side configuration elements. This is due to the fact that in the completed state of the seat back board, the issue of whether the configuration element of the coupling and fixing members are included on the back spring section side or included on the back board portion side is merely one of classification.

Moreover, in each of the exemplary embodiments described above, explanation has been given of an anchoring structure for anchoring the cover 20 of the seatback 12 to the back spring section 38 (resin spring) provided to the seatback 12, however embodiments are not limited thereto, and a structure for anchoring a seat covering of a seat cushion may be applied to a resin spring provided to the seat cushion. In such cases, configuration is made wherein a seat cushion pad is supported by a resin spring with both end sides supported on a seat cushion frame, and clips attached on the side of the seat covering that covers the front face of the seat cushion pad are anchored to edge portions of openings formed to the resin spring.

Moreover, in each of the exemplary embodiments described above, configuration is made wherein plural sets of opening 58, 69 pairs are formed to the back spring section 38 so as to be adjacent to each other along different directions, thereby forming the plural vertical clip engagement portions 59 and the horizontal clip engagement portions 71 that extend in different directions to each other, with the clips 22C, 24C engaging with the clip engagement portions 59, 71. Embodiments are not limited thereto, and the profiles and directions of the pairs of openings and the clip engagement portions may be varied as appropriate.

In each of the above exemplary embodiments, configuration is made wherein both seatback width direction end portions of the lower side back spring portion 44 (44') and the upper side back spring portion 46 (46') are fixed to the side frames 26, and the openings 58, 69 are formed at locations excluding both seatback width direction end portions and the seatback width direction central portions of the lower side back spring portion 44 (44') and the upper side back spring portion 46 (46'). Embodiments however are not limited thereto, and the placement of the openings may be varied as appropriate.

Moreover, in each of the above exemplary embodiments, configuration is made wherein the pairs of openings 58, 68 are respectively formed adjacent to each other in the back spring section 38, and the clip engagement portions 59, 71 are configured between the pairs of openings 58, 69, with the clip engagement portions 59, 71 being gripped by the clips 22C, 24C that include the pairs of arm portions 86. Embodiments however are not limited thereto, and the number of openings and the configuration of the clips (anchor means) may be varied as appropriate. For example, configuration may be made wherein anchor means (anchoring implements) provided at leading end sides with hook portions (hooking shapes) that are capable of resilient deformation are inserted into a single opening and catch on an edge portion of the opening.

In each of the exemplary embodiments described above, configuration is made wherein the back spring section 38 is provided with the flexing portions 48A, 49A, 51A, 54A (48A', 49A', 51A', 54A') that are formed with wave shaped cross-section profiles, and the openings 58, 69 are formed in these flexing portions. Embodiments however are not limited thereto, and the profiles of the flexing portions may be varied as appropriate. Configuration may also be made wherein the openings are formed to flat plate shaped portions other than the flexing portions.

Moreover, in each of the above exemplary embodiments the back spring section 38 is split into the lower side back spring portion 44 (44') and the upper side back spring portion 46 (46'), however there is no limitation thereto, and the two components may be connected and integrated together. Namely, a configuration may be adopted wherein the lower side board side portion 50 is extended to the seatback upper side and both seatback width direction end portions of upper side the back spring body portion 54 (54') joined thereto.

In each of the above exemplary embodiments, the upper side back spring portion 46 (46') is configured by a single tier (1 individual), however there is no limitation thereto, and configuration may be made with plural tiers (plural) of the upper side back spring portion 46 (46'), with plural tiers (plural) back spring portions provided at equal separations spanning from an upper portion to a lower portion of the back board portion 36.

In the present exemplary embodiment, the upper side back spring portion 46 (46') is configured by a single tier (1 individual), however there is no limitation thereto, and configuration may be made with plural tiers (plural) of the upper side back spring portion 46 (46'), with plural tiers (plural) back spring portions provided at equal separations spanning from an upper portion to a lower portion of the back board portion 36.

Various other modifications may be implemented within a range not departing from the spirit of the present invention. The scope of rights encompassed by the present invention is obviously not limited by each of the exemplary embodiments described above.

The invention claimed is:

1. A vehicle seat comprising:
a resin spring that is (i) made from resin, (ii) supported at both end sides by a seat frame, and (iii) formed with at least one pair of adjacent openings, each pair with a clip engagement portion configured between the pair of openings, the resin spring including a flexing portion between both end sides, the flexing portion having a wave-shaped cross-section profile which extends in a seatback width direction, formed of plural curved faces joined together in the width direction, and configured to stretch when a load acts in a direction toward a seatback rear side;
a pad supported on the resin spring;
a seat cover that covers a front face of the pad; and
a clip that is attached to a seat cover side that includes a pair of arm portions that are respectively inserted into the pair of openings, with a hook portion formed at a leading end side of each of the pair of arm portions, the respective hook portions hooking onto the clip engagement portion to anchor the clip to edge portions of the pair of openings.

2. The vehicle seat of claim 1, wherein:
the clip is configured such that when base end sides of the pair of arm portions are brought towards each other, the leading end sides of the pair of arm portions pivot about an intermediate portion of the pair of arm portions so as to move apart from each other.

3. The vehicle seat of claim 1, wherein:
the openings are formed in the flexing portion.

4. The vehicle seat of claim 1, wherein:
the resin spring is fixed at both end portions to the seat frame; and
the openings are formed at a location excluding both end portions and a central portion of the resin spring.

5. The vehicle seat of claim 1, further comprising:
a plurality of clips; and
a plurality of pairs of adjacent openings, wherein:
at least two of the clips attached to the seat cover side are respectively anchored to at least two of the clip engagement portions formed at the resin spring, such that the at least two of the clips have different engagement directions, with respect to the clip engagement portions and each other, the seat cover thereby positioning the pad with respect to the resin spring in at least two directions.

6. The vehicle seat of claim 1, wherein:
the seat frame is a seatback frame including a pair of left and right side frames;
the resin spring is disposed along the seatback width direction between the pair of side frames;

the pad is a seatback pad that is disposed on a front face side of the resin spring and that is provided with a communication portion that places a front face side and a rear face side of the pad in communication with each other;

the seat cover covers at least the front face side of the seatback pad; and the clip is inserted through the communication portion and anchored to the edge portions of the pair of openings.

7. The vehicle seat of claim 6, wherein:

the resin spring is integrally provided to a seat back board that is made from resin and is provided with a back board portion disposed at a back face side of the seatback frame.

8. The vehicle seat of claim 7, wherein:

a plurality of the resin springs are provided so as to be separated from each other in a height direction of the seatback, the plurality of resin springs being set with a draft so as to enable removal from a mold in one of the seatback height directions.

9. The vehicle seat of claim 2, wherein intermediate portions of each of the pair of arm portions are provided with projection portions that project out in directions approaching each other.

10. The vehicle seat of claim 1, wherein:

the flexing portion has the wave-shaped cross-section profile when viewed in a direction substantially perpendicular to the direction toward the seatback rear side.

* * * * *